United States Patent [19]
Brandstetter et al.

[11] Patent Number: 5,473,927
[45] Date of Patent: Dec. 12, 1995

[54] TRANSFER DEVICE FOR THE TRANSPORT OF WORKPIECES

[75] Inventors: Rudi Brandstetter, Adelberg; Andreas Dangelmayr, Ottenbach; Wolfgang Genswürger, Nuertingen; Hans Hofele, Goeppingen, all of Germany

[73] Assignee: L. Schuler, Germany

[21] Appl. No.: 217,593

[22] Filed: Mar. 25, 1994

[30] Foreign Application Priority Data

Mar. 25, 1993 [DE] Germany .................. 43 09 643.3

[51] Int. Cl.[6] ................................................ B21D 43/05
[52] U.S. Cl. ................................................ 72/405
[58] Field of Search ..................... 72/405, 421, 422; 198/621

[56] References Cited

U.S. PATENT DOCUMENTS

| | | | |
|---|---|---|---|
| 4,682,280 | 7/1987 | Schneider et al. | 364/191 |
| 4,979,888 | 11/1990 | Shiraishi | 72/405 |
| 5,121,623 | 6/1992 | Brzezniak | 72/405 |
| 5,248,288 | 9/1993 | Kamiya | 72/405 |

FOREIGN PATENT DOCUMENTS

| | | | |
|---|---|---|---|
| 0556562 | 1/1993 | European Pat. Off. | 72/405 |
| 3634756 | 6/1987 | Germany | 72/405 |
| 0147480 | 3/1989 | Germany | 72/405 |
| 3933888 | 7/1990 | Germany | 72/405 |
| 2227697 | 8/1990 | United Kingdom | 72/405 |

*Primary Examiner*—Daniel C. Crane
*Attorney, Agent, or Firm*—Evenson, McKeown, Edwards & Lenahan

[57] ABSTRACT

A transfer device in a simulator or a press has two transport rails which extend in the press passage direction and which can be moved in two or three axes. One or several carrier rails are detachably mounted on each transport rail. For a tool change, the carrier rails can be deposited on depositing supports of the sliding table. Between the transport rails and the carrier rails, locking and fastening devices are provided which permit a coupling-uncoupling operation which is caused by the movements of the carrier rails in the axes.

8 Claims, 2 Drawing Sheets

5,473,927

TRANSFER DEVICE FOR THE TRANSPORT OF WORKPIECES

BACKGROUND AND SUMMARY OF THE INVENTION

The present invention relates to a transfer device for the workpiece transport in simulators, presses and similar tooling or processing machines that have at least one transport rail which extends in a press passage direction and which may be movably disposed and driven transversely to the press passage direction, in lifting and lowering directions, and horizontally in the press passage direction.

In simulators, presses and similar tooling and machining equipment, accessibility must exist to the tool, to the gripping elements and to the driving elements of the transfer devices. The tool exchange and the exchange of transfer devices must take place fully automatically and must be optimizable for this purpose.

In European Patent Document EP 0 147 480 B1, a simulator is described by means of which desired tooling values are determined which are to be assigned to the tool set that is to be set up. The transfer device comprises devices for the movements of gripper rails in the three axes, (for the opening and closing, for the lifting and lowering, for the transfer and the return), such as a central drive or individual motors.

In German Patent Document DE 36 34 756 A1, a gripping rail changing system on a transfer press is described, in which the changing operation of the gripper rails takes place during the changing operation of the tools. By means of the main drive of the press, the gripper rails are brought into a delivery position in which a lifting mechanism on a sliding-table side takes over by means of a lifting movement the gripper rail portion which can be detached from the gripper rail.

In contrast to this state of the art, it is an object of the present invention to exchange during a tool change neither the gripper rail nor gripper rail portions which are to be uncoupled from it in a parting line.

It is another object of the invention to carry out a longitudinal division of the gripper rails in that these are split up into a transport rail extending through the whole press and into one or several carrier rails which extend along the transport rail, in which case the movements of the main drive or drives will be utilized without any additional lifting-lowering movement of the sliding table.

These and other objects are achieved by the present invention which provides a transfer device for workpiece transport in simulators, presses and similar tooling or processing machines, comprising at least one transport rail which extends in a press passage direction and which is movable and drivable transversely to the press passage direction, in lifting and lowering directions, and horizontally in the press passage direction. At least one carrier rail is provided that is adapted to receive gripping devices and is fixable on the transport rail. Centering and fastening devices fix the carrier rail to the transport rail for operation of the transfer device, and allow the carrier rail to be taken off the transport rail onto depositing supports on a sliding table for an exchange during a tool change.

The objects are also achieved by another embodiment of the present invention which provides a transfer device for workpiece transport in simulators, presses and similar tooling or processing machines, comprising two transport rails which extend in a press passage direction and which are movably disposed and driven at least in lifting, lowering and horizontal directions. At least one carrier rail per transport rail is provided and is adapted to receive at least one traverse and is fixable on the transport rail. Centering and fastening devices fix the carrier rail to the transport rail for operation of the transfer device, and allow the carrier rail to be taken off the transport rail onto depositing supports on a sliding table for an exchange during a tool change.

Significant advantages are achieved for the invention because of the fact that the transport rail does not have to be divided in its overall length. High investments therefore become unnecessary in the area of the parting planes which extend transversely with respect to the longitudinal course. The transport rails are situated above the transport plane of the workpieces. The cross-sections for the transport rails may be minimized. Better and lighter materials, such as reinforced plastic materials, may be used. The unavoidable vibrations which result from the three axis movements are reduced considerably. As a result, the whole stroke number range of the press can be utilized and the ejection numbers can be increased correspondingly. Irrespective of the type of the main drive, the transfer device can be used in a manner in which it is cam-guided in the axes or driven by an individual motor.

Other objects, advantages and novel features of the present invention will become apparent from the following detailed description of the invention when considered in conjunction with the accompanying drawings.

DETAILED DESCRIPTION OF THE DRAWINGS

Figure 1:
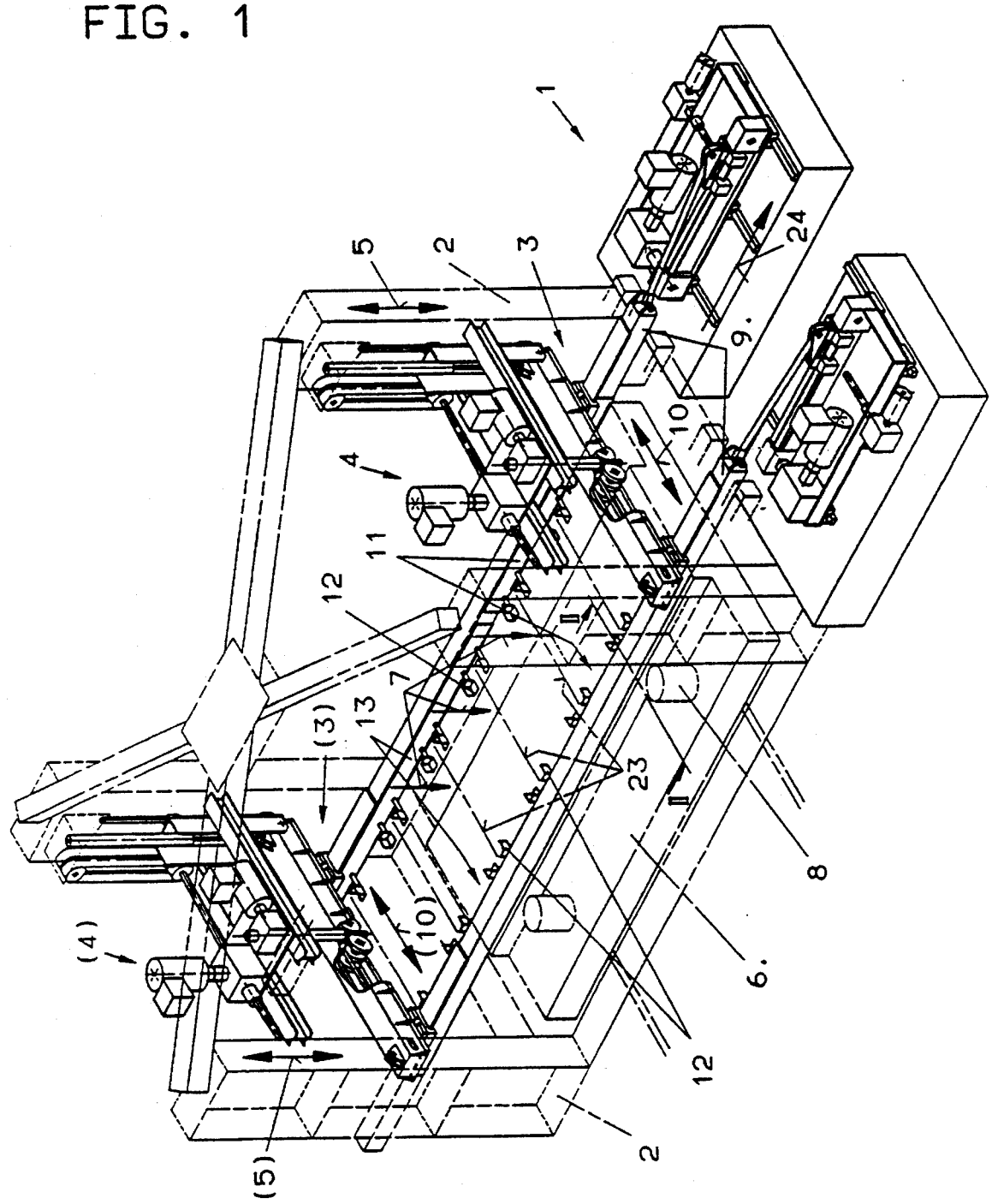
FIG. 1 is a perspective view of a simulator (or tooling machine) of the present invention.

Instead of the tooling machine illustrated in FIG. 1, a press, a multistation press, a large-piece press or similar processing machine may also be used for explaining the use of the invention.

Reference number 1 indicates a drive for the transfer movement of transport rails 9 in a horizontal direction, indicated as press passage direction 24. In the area of the stands 2, drives 3 are arranged for a transverse movement 10 and drives 4 are arranged for a lifting - lowering movement 5. One or several sliding tables 6 comprising tools to be set up in stations 7 are moved between the stands 2. Carrier rails 11, 13 are fastened to the transport rails 9, as will be explained in detail with respect to FIG. 2. The carrier rails 11, 13 are equipped with gripping devices 12 or with traverses 23. Only the receiving devices of the gripping devices or traverses on the carrier rails 11, 13 are visible in FIG. 1. When using traverses 23, the drive 3 is to be stopped, to thereby prevent transverse movement 10.

The division into sections of a carrier rail 11, 13, which extends along the tool area and the stand areas, is advantageous. When the carrier rails 11, 13 are equipped with gripping devices 12, the depositing of the carrier rails 11, 13 for the tool change on the sliding table 6 takes place, for example, by a movement of the transport rails 9 in the press passage direction 24 in order to first move a first portion 11 of the carrier rail and then the second portion 13 with respect to the depositing position. In this case, the portions of the carrier rails that extend into the stand areas (no-load station) are moved into the area of the sliding table 6. The movement in the press passage direction 24 by means of drive 1 may be followed by a movement in the transverse direction 10, then by a lowering movement of the transport rails until the carrier rails 11, 13 are placed on depositing support 8, for example, on the top side of the sliding table 6. When traverses 23 are used which are equipped with suction devices, the transverse movement 10 for the depositing may not be necessary. Several depositing supports 8 exist in front of and behind the tool. The depositing supports 8 are used for the detaching and the fixing of the carrier rails 11, 13 from the transport rail 9 or on it.

Figure 2:
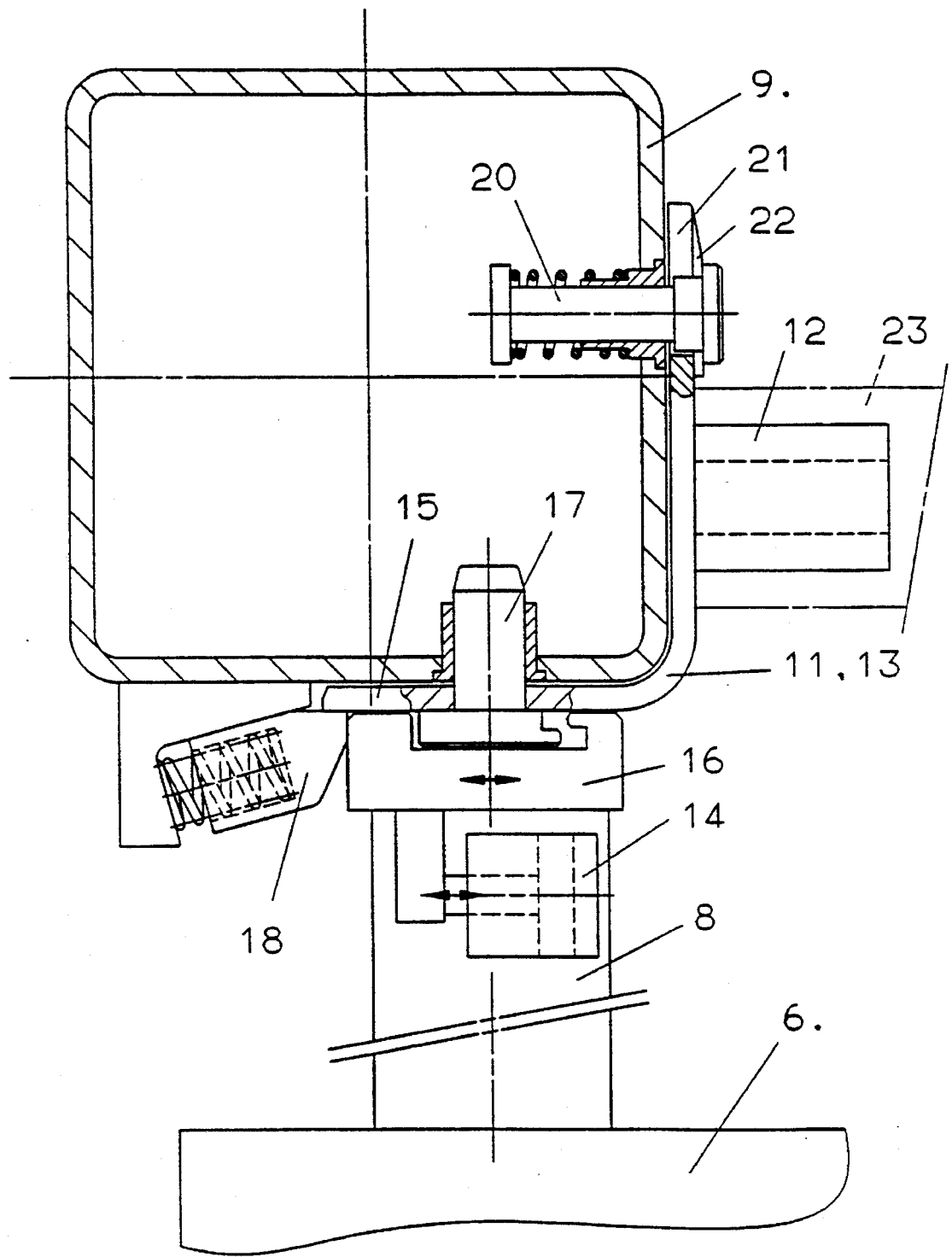
FIG. 2 is a sectional view according to the course II—II in FIG. 1.

FIG. 2 is a sectional view of a transport rail 9. In an upright lateral wall of the transport rail 9, a spring-biased pin 20 is provided whose head portion can be displaced by means of a stopping slope 22 for an improved support and contact pressure. Several pins 20 may be provided for one carrier rail 11 or 13 which can be carried along in corresponding grooves 21. In a lower horizontally extending web portion of the transport rail 9, an opening is provided which has a bush into which a pin 17 is guided. The pin 17 is fastened to the carrier rail 11, 13 and has a molded-on head portion behind which a bolt 16 can be locked on the depositing support 8. The lower horizontal web portion of the transport rail 9 is also provided with a spring-biased cam 18 which reaches under a horizontally extending web portion 15 on the carrier rail 11, 13. When the carrier rail 11, 13 is detached from the transport rail 9, the cam 18 can be disengaged from the web portion 15 by means of the bolt 16. The bolt 16 can be moved by an adjusting device, such as a pressure cylinder 14.

The depositing of the carrier rails 11, 13 takes place first by bringing the carrier rails 11, 13 into a depositing position by the movements of the transport rails 9. By the locking of the bolts 16 behind the head portions of the pin 17, the spring-biased cams 18 are at the same time moved into the release position (to the left in FIG. 2). By means of the drives 3, the transport rails 9 are moved in the horizontal direction 10. In this case, the pins 20 disengage from the carrier rails 11, 13 and from the centering with the pin 17. After the tool change, the retooled carrier rails 11, 13 are moved via the sliding table 6 into the area of the transport rails 9 and are taken over by them in a sequence that is reverse to the above-described coupling-releasing case.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A transfer device for workpiece transport, comprising:
   at least one transport rail which extends in a press passage direction and which is movable and drivable by drive means transversely to the press passage direction, in lifting and lowering directions, and horizontally in the press passage direction;
   at least one carrier rail operatively associated with gripping devices and fixable on the transport rail;
   a sliding table;
   centering and fastening devices that fix the carrier rail to the transport rail for operation of the transfer device, and allow the carrier rail to be taken off the transport rail onto fixed depositing supports on the sliding table for an exchange during a tool change, whereby the drive means is used for the exchange without any lifting and lowering of the fixed depositing supports.

2. A transfer device according to claim 1, further comprising a moving drive coupled to the transport rail to provide the driving of the transport rail, taking-off of the carrier rail from the transport rail onto the sliding table, and taking-over of the carrier rails by the transport rail.

3. A transfer device according to claim 2, wherein each of the carrier rails includes an angle profile having a web portion which is bent horizontally, in which web portion a plurality of pins are firmly mounted along the length of the carrier rail, each pin having a perpendicularly upwardly projecting centering part, each carrier rail having a groove having a top opening in which a plurality of spring-biased pins are received, the transport rail having a perpendicularly upright lateral part in which the spring-biased pins are inserted, the transport rail having a bottom side on which at least one elastically disposed cam is arranged which extends under the web portion in an operating condition of the transfer device.

4. A transfer device according to claim 1, wherein the depositing supports are arranged on the sliding table for the taking-off of the carrier rails on the sliding table, said depositing supports being assigned to the areas of the pins on the carrier rail, wherein the depositing supports have bolts which are movable by a motor and which reach behind a molded-on portion on the pin and can be lockingly engaged and disengaged with the pins and at the same time interact with a spring-biased cam to unlock the carrier rail from the transport rail.

5. A transfer device for workpiece transport, presses, tooling machines and processing machines, comprising:
   two transport rails which extend in a press passage direction and which are movably disposed and driven by drive means at least in lifting, lowering and horizontal directions;
   at least one carrier rail per transport rail operatively associated with at least one traverse and fixable on the transport rail;
   a sliding table;
   centering and fastening devices that fix the carrier rail to the transport rail for operation of the transfer device, and allow the carrier rail to be taken off the transport rail onto fixed depositing supports on the sliding table for an exchange during a tool change, whereby the drive means is used for the exchange without any lifting and lowering of the fixed depositing supports.

6. A transfer device according to claim 5, further comprising a moving drive coupled to the transport rail to provide the driving of the transport rail, taking-off of the carrier rail from the transport rail onto the sliding table, and taking-over of the carrier rails by the transport rail.

7. A transfer device according to claim 6, wherein each of the carrier rails includes an angle profile having a web portion which is bent horizontally, in which web portion a plurality of pins are firmly mounted along the length of the carrier rail, each pin having a perpendicularly upwardly projecting centering part, each carrier rail having a groove having a top opening in which a plurality of spring-biased pins are received, the transport rail having a perpendicularly upright lateral part in which the spring-biased pins are inserted, the transport rail having a bottom side on which at least one elastically disposed cam is arranged which extends under the web portion in an operating condition of the transfer device.

8. A transfer device according to claim 5, wherein the depositing supports are arranged on the sliding table for the taking-off of the carrier rails on the sliding table, said depositing supports being assigned to the areas of pins on the carrier rail, wherein the depositing supports have bolts which are movable by a motor and which reach behind a molded-on portion on the pin and can be lockingly engaged and disengaged with the pins and at the same time interact with a spring-biased cam to unlock the carrier rail from the transport rail.

* * * * *